US008831026B2

(12) United States Patent
Iyengar et al.

(10) Patent No.: US 8,831,026 B2
(45) Date of Patent: Sep. 9, 2014

(54) METHOD AND APPARATUS FOR DYNAMICALLY SCHEDULING REQUESTS

(75) Inventors: Arun Kwangil Iyengar, Yorktown Heights, NY (US); Erich M. Nahum, New York, NY (US); Bianca Schroeder, Pittsburgh, PA (US)

(73) Assignee: International Business Machines Corporation, Armonk, NY (US)

(*) Notice: Subject to any disclaimer, the term of this patent is extended or adjusted under 35 U.S.C. 154(b) by 3655 days.

(21) Appl. No.: 10/804,516

(22) Filed: Mar. 19, 2004

(65) Prior Publication Data
US 2005/0207439 A1   Sep. 22, 2005

(51) Int. Cl.
*H04L 12/54* (2013.01)
*H04L 29/08* (2006.01)

(52) U.S. Cl.
CPC .......... *H04L 67/322* (2013.01); *H04L 67/2809* (2013.01); *H04L 67/2814* (2013.01)
USPC ...................................... 370/428; 370/395.43

(58) Field of Classification Search
USPC .......... 370/428, 229, 232; 709/226, 232, 233; 718/100
See application file for complete search history.

(56) References Cited

U.S. PATENT DOCUMENTS

| | | | | |
|---|---|---|---|---|
| 6,006,264 A * | 12/1999 | Colby et al. | ................... | 709/226 |
| 6,112,221 A * | 8/2000 | Bender et al. | ................... | 718/102 |
| 6,430,156 B1 * | 8/2002 | Park et al. | ...................... | 370/232 |
| 6,449,647 B1 * | 9/2002 | Colby et al. | ................... | 709/226 |
| 6,628,610 B1 * | 9/2003 | Waclawsky et al. | .......... | 370/229 |
| 6,658,453 B1 * | 12/2003 | Dattatri | ......................... | 709/202 |
| 6,772,211 B2 * | 8/2004 | Lu et al. | ....................... | 709/226 |
| 6,807,156 B1 * | 10/2004 | Veres et al. | ................... | 370/252 |
| 6,862,624 B2 * | 3/2005 | Colby et al. | ................... | 709/226 |
| 6,877,035 B2 * | 4/2005 | Shahabuddin et al. | ........ | 709/226 |
| 6,968,389 B1 * | 11/2005 | Menditto et al. | .............. | 709/233 |
| 6,978,311 B1 * | 12/2005 | Netzer et al. | ................... | 709/232 |
| 6,981,029 B1 * | 12/2005 | Menditto et al. | .............. | 709/217 |
| 7,082,463 B1 * | 7/2006 | Bradley et al. | ................ | 709/223 |
| 7,140,016 B2 * | 11/2006 | Milovanovic et al. | ........ | 718/100 |

(Continued)

OTHER PUBLICATIONS

Borzemski, Leszek and Krzysztof Zatwarnicki, A Fuzzy Adaptive Request Distribution Algorithm for Cluster-based Web Systems, Proceedings of the Eleventh Euromidro Conference on Parallel, Distributed and Network-Based Processing (Euro-PDP'03), IEEE 2003.*

(Continued)

*Primary Examiner* — Luat Phung
(74) *Attorney, Agent, or Firm* — Preston J. Young; Ryan, Mason & Lewis, LLP

(57) ABSTRACT

Techniques are provided for dynamically scheduling requests in data processing systems in accordance with differentiated service levels. In a first aspect of the invention, a technique for processing a request to at least one server comprises the following steps. A request is received. Then, submission of the request to the at least one server is scheduled based on: (i) a quality-of-service (QoS) class assigned to a client from which the request originated; (ii) a response target associated with the QoS class; and (iii) an estimated response time associated with the at least one server. The technique may further comprise the step of withholding the request from submission to the at least one server when the request originated from a client assigned to a first QoS class to allow a request that originated from a client assigned to a second QoS class to meet a response target associated therewith.

25 Claims, 3 Drawing Sheets

(56) References Cited

U.S. PATENT DOCUMENTS

| | | | |
|---|---|---|---|
| 7,257,634 B2* | 8/2007 | Colby et al. | 709/226 |
| 2002/0010798 A1* | 1/2002 | Ben-Shaul et al. | 709/247 |
| 2002/0019843 A1* | 2/2002 | Killian et al. | 709/102 |
| 2003/0120705 A1* | 6/2003 | Chen et al. | 709/104 |
| 2004/0088418 A1* | 5/2004 | Iyer et al. | 709/227 |
| 2004/0105393 A1* | 6/2004 | Ronneke et al. | 370/252 |
| 2004/0111506 A1* | 6/2004 | Kundu et al. | 709/223 |
| 2004/0162901 A1* | 8/2004 | Mangipudi et al. | 709/225 |
| 2004/0193472 A1* | 9/2004 | Ramakrishnan et al. | 705/9 |
| 2004/0205752 A1* | 10/2004 | Chou et al. | 718/100 |
| 2004/0258003 A1* | 12/2004 | Kokot et al. | 370/254 |
| 2004/0260951 A1* | 12/2004 | Madour | 713/201 |
| 2005/0091344 A1* | 4/2005 | Chen et al. | 709/219 |
| 2005/0198200 A1* | 9/2005 | Subramanian et al. | 709/218 |
| 2005/0207439 A1* | 9/2005 | Iyengar et al. | 370/428 |
| 2007/0115893 A1* | 5/2007 | Livet et al. | 370/337 |

OTHER PUBLICATIONS

Ludwig, Heiko, Web Services QoS: External SLAs and Internal Policies Or: How do we deliver what we promise?, Proceedings of the Fourth International Conference on Web Information Systems Engineering Workshops, IEEE 2004.*

H-U. Heiss et al., "Adaptive Load Control in Transaction Processing Systems," Proceedings of the 17th International Conference on Very Large Data Bases, Barcelona, pp. 47-54, Sep. 1991.

A. Moenkeberg et al., "Performance Evaluation of an Adaptive and Robust Load Control Method for the Avoidance of Data-Contention Thrashing," Department of Computer Science Information Systems-Databases, Proc. of the 18th VLDB Conference, Canada, pp. 432-443, Aug. 1992.

A. Rhee et al., "The Oracle Database Resource Manager: Scheduling CPU Resources at the Application Level," High Performance Transaction Systems Workshop, 4 pages, 2001.

L. Eggert et al., "Application-Level Differentiated Services for Web Servers," USC Information Sciences Institute, vol. 2, pp. 1-12, Feb. 1999.

H. Chen et al., "Session-Based Overload Control in QoS-Aware Web Servers," IEEE Infocom, 9 pages, 2002.

X. Chen et al., "An Admission Control Scheme for Predictable Server Response Time for Web Accesses," Proceedings 10th World Wide Web Conference, pp. 545-554, May 2001.

J. Carlström et al., "Application-Aware Admission Control and Scheduling in Web Servers," IEEE Proceedings of Infocom, New York, 10 pages, Jun. 2002.

M.J. Carey et al., "Load Control for Locking: The 'Half-and-Half' Approach," Proceedings of the 9th ACM SIGACT-SIGMOD-SIGART Symposium on Principles of Database Systems, pp. 72-84, Apr. 1990.

M. Aron et al., "Cluster Reserves: A Mechanism for Resource Management in Cluster-Based Network Servers," Proc. ACM SIGMETRICS, 12 pages, 2000.

U.S. Appl. No. 10/316,259, filed Dec. 10, 2002, A.N. Tantawi et al.

M. Kihl et al., "Admission Control Schemes Guaranteeing Customer QoS in Commercial Web Sites," Department of Communication Systems, Lund Institute of Technology, IFIP and IEEE Conference on Network Control and Engineering (NETCON), Sweden, 12 pages, Oct. 2002.

K-D. Kang et al., "Service Differentiation in Real-Time Main Memory Databases," Proceedings of the Fifth IEEE International Symposium on Object-Oriented Real-Time Distributed Computing, 10 pages, 2002.

V. Kanodia et al, "Ensuring Latency Targets in Multiclass Web Servers," IEEE Transactions on Parallel and Distributed Systems, vol. 14, No. 1, pp. 84-93, Jan. 2003.

J. Huang et al., "On Using Priority Inheritance in Real-Time Databases," IEEE, pp. 210-221, 1991.

L. Cherkasova et al., "Session-Based Admission Control: A Mechanism for Peak Load Management of Commercial Web Sites," IEEE Transactions on Computers, vol. 51, No. 6, pp. 669-685, Jun. 2002.

T.F. Abdelzaher et al., "User-Level QoS-Adaptive Resource Management in Server End-Systems," IEEE, pp. 678-685, 2003.

T.F. Abdelzaher et al., "Performance Guarantees for Web Server End-Systems: A Control-Theoretical Approach," IEEE Transactions of Parallel and Distributed Systems, vol. 13, No. 1, pp. 80-96, Jan. 2002.

J.D.C. Little, "A Proof for the Queuing Formula: $L=\lambda W$," Case Institute of Technology, Ohio, pp. 383-387, 1960.

* cited by examiner

METHOD AND APPARATUS FOR DYNAMICALLY SCHEDULING REQUESTS

FIELD OF THE INVENTION

The present invention is related to data processing systems and, more particularly, to techniques for dynamically scheduling requests of customers of data processing systems in accordance with differentiated service levels.

BACKGROUND OF THE INVENTION

As is known, data processing systems may include database systems and transactional processing systems. Such systems may be standalone systems or may be part of a distributed network such as the World Wide Web. In a distributed network such as the World Wide Web, a user request is typically first processed at a server running the application with which the user is interfacing, e.g., an application server, and then processed at a server that controls storage of data that is used to service the user request, e.g., a back-end server.

An important aspect of the performance of a back-end server of a data processing system is the speed at which requests are serviced. As a typical example for a back-end server consider the database back end at a commercial web site. For such a site, it is typically vital to provide short response times to client requests. Moreover, the bottleneck in processing customers' requests is commonly the retrieval of data from the database back end. Hence, the goal of offering short response times to clients at commercial web sites often reduces to the goal of providing short response times at the back-end server.

Providing short response times to all requests at the back-end server might not always be possible, since the server's resources are limited and might not be sufficient to provide optimal service to all requests. This problem is exacerbated by the fact that server peak loads are often orders of magnitudes higher than average loads. Provisioning the system for peak loads might therefore not be feasible, or simply too wasteful, since under normal load conditions many resources would go under-utilized.

In cases where it is not possible to provide optimal service to all requests, it is typically important to provide fast service at least to the most important requests coming into the site. In the case of the database back end at a web site, important requests could, for example, be those coming from customers who have spent large amounts of money at this web site in the past. Differences in the importance of requests can also arise from that fact that, in addition to customer requests, a database might run requests from inside the site such as, for example, requests handling basic maintenance tasks. Customer requests should generally have higher priority than these background maintenance tasks. Finally, customer requests might differ in their importance depending on the type of the requests. As an example, requests that implement customer orders might be more valuable to a commercial web site than requests that just provide services for browsing the site.

There are typically two ways of implementing functionality for prioritizing requests. One is to implement request priority by integrating the scheduler into the back-end server software, the other one is to locate an external scheduler between the application server and the back-end server.

Internal schedulers are integrated into the server code, hence, obviously the implementation of the scheduling mechanisms depends on the particular server software. Moreover, the most effective way of implementing priorities inside the server might also depend on other factors such as the hardware and the operating system, or even the workload running on the system. Another drawback of internal scheduling is its high complexity. Many types of back-end servers, e.g., database systems, have been developed over a long period of time and, as a result, include extremely complex code. Integrating the scheduler into the server requires changing this complex code. Furthermore, this work will need to be repeated for every new server software package.

External scheduling has several advantages such as increased flexibility and portability. Previous approaches in the area of back-end servers in the form of database servers have employed external scheduling mostly in the form of admission control with the goal of avoiding server overload. The main idea is to either directly monitor the degree of lock contention, e.g., by keeping track of the average time a request is blocked for locks, or to monitor response times of requests or system throughput. Previous approaches in the area of back-end servers in the form of web servers focus on providing preferred service for high priority requests in the form of faster response times, but do not offer efficient mechanisms for achieving quality of service (QoS) goals such as specific response time targets.

Thus, improved techniques are needed for scheduling requests of customers of data processing systems.

SUMMARY OF THE INVENTION

The present invention provides techniques for dynamically scheduling requests in data processing systems in accordance with differentiated service levels.

In a first aspect of the invention, a technique for processing a request to at least one server comprises the following steps. A request is received. Then, submission of the request to the at least one server is scheduled based on: (i) a quality-of-service (QoS) class assigned to a client from which the request originated; (ii) a response target associated with the QoS class; and (iii) an estimated response time associated with the at least one server.

The technique may further comprise the step of withholding the request from submission to the at least one server when the request originated from a client assigned to a first QoS class to allow a request that originated from a client assigned to a second QoS class to meet a response target associated therewith. The technique may also further comprise the steps of determining a throughput of the at least one server, and reducing a request withhold rate to increase throughput of the at least one server. Also, the technique may further comprise the steps of monitoring a throughput of the at least one server, and varying a request withhold rate to balance the throughput and request response times.

Further, the technique may further comprise the step of assigning the response target to the QoS class. The step of assigning the response target to the QoS class may further comprise the step of assigning a response time target to the QoS class. The step of assigning the response target to the QoS class may further comprise the step of assigning a response percentile target to the QoS class.

Still further, the technique may further comprise the step of estimating the response time associated with the at least one server based on one or more requests sent to the at least one server within a given time period. The technique may also further comprise the step of assigning a target response time to a plurality of QoS classes in which lower quality classes are assigned larger response times than higher quality classes. Also, the technique may further comprise the steps of determining dispatch times for requests from a difference between at least one predicted response time of the at least one server and the target response time corresponding to the QoS class of the request, and sending requests to the at least one server based on dispatch times.

Yet further, a plurality of applications may be running on the at least one server and requests may be routed to applications, such that the technique may further comprise the steps of estimating response times of applications based on one or more requests sent to the applications within a time period, and sending a request to an application whose estimated response time is not greater than a target response time corresponding to the QoS class of the request. The technique may further comprise the step of varying a number of requests sent to applications so that estimated response times of applications are not greater than target response times of QoS classes corresponding to requests sent to the applications. The at least one server may comprise a plurality of servers and each application runs on a different one of the plurality of servers.

In a second aspect of the invention, apparatus for processing a request to at least one server comprises a memory, and at least one processor coupled to the memory and operative to receive a request, and schedule submission of the request to the at least one server based on: (i) a quality-of-service (QoS) class assigned to a client from which the request originated; (ii) a response target associated with the QoS class; and (iii) an estimated response time associated with the at least one server. The memory and the at least one processor may form a scheduler that is external to the at least one server. The scheduler may be a front-end scheduler and the at least one server may be a back-end server.

In a third aspect of the invention, a technique for processing requests to at least one server comprises the following steps. At least one client is assigned to a quality-of-service (QoS) class from among at least two QoS classes. A response target is assigned to at least one QoS class. At least one response time of the at least one server is estimated based on one or more requests sent to the server within a given time period. Requests associated with a first one of the at least two QoS classes are withheld to allow requests associated with a second one of the at least two QoS classes to meet its response target based on the at least one estimated response time. Such a technique may be implemented in accordance with a scheduling service provided by a service provider.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
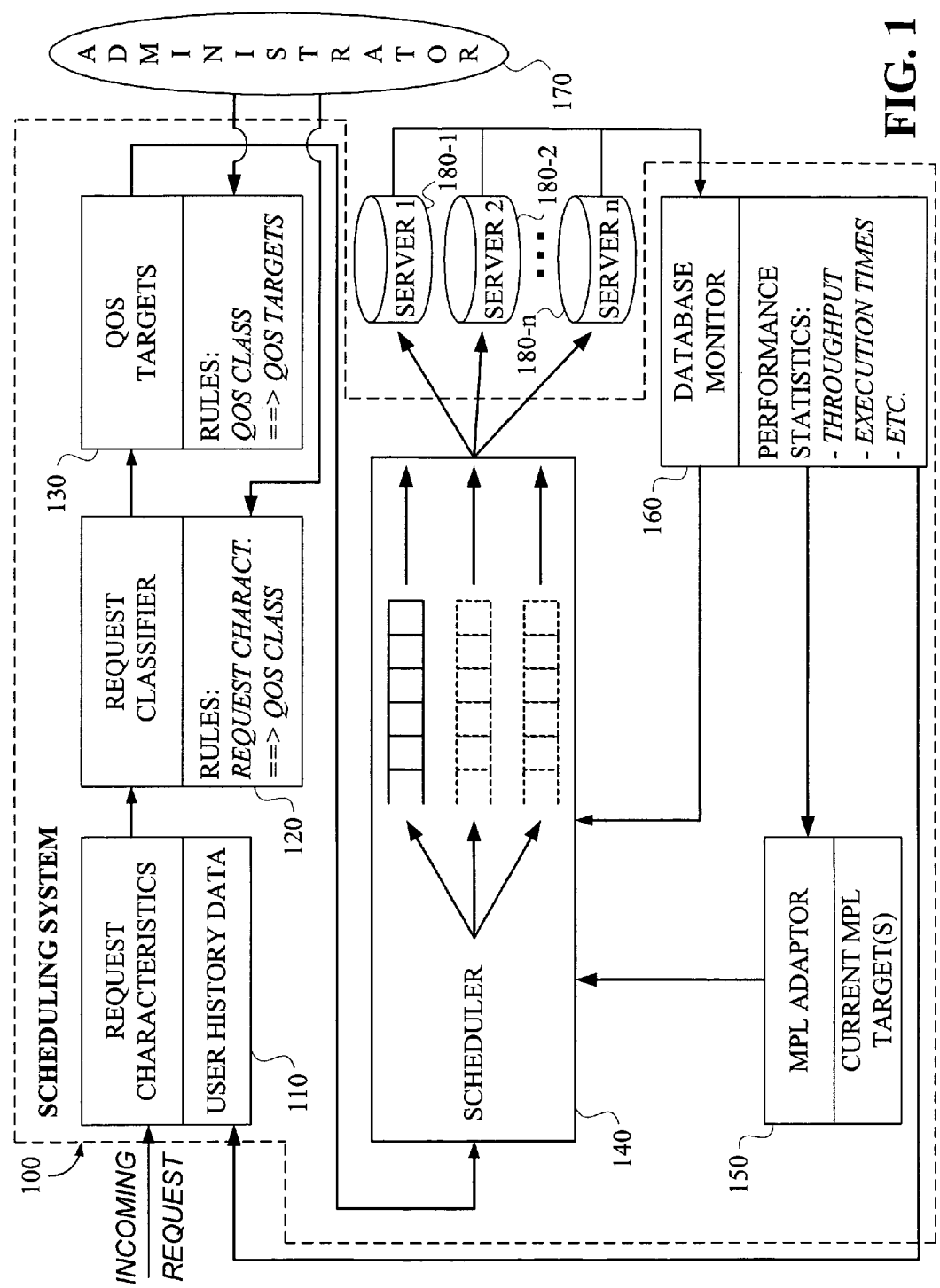
FIG. 1 is a block diagram illustrating a request scheduling system in accordance with an embodiment of the present invention.

The present invention will be illustratively explained below in the context of back-end servers in a World Wide Web implementation. However, it is to be understood that the present invention is not limited to such a data processing environment. Rather, the invention is more generally applicable to any data processing environment in which it would be desirable to provide efficient servicing of user requests by providing different classes of service for user requests.

As illustratively used herein, the term "client" may generally refer to one or more computing systems (e.g., personal computer, personal digital assistant, cellphone, laptop, etc.) capable of making a request to a server (e.g., by connecting to a network to obtain data). A "client" may also occasionally refer to the individual(s) using the computing system (this will be clear from the circumstances). A "server" may generally refer to one or more computing systems capable of responding to a client request (e.g., by generating and serving content available on the network).

As will be illustratively explained below, the invention provides techniques for scheduling requests at back-end servers in order to provide differentiated classes of quality of service (QoS). The techniques are implemented in the form of a scheduler external to the server. Such an implementation obviates the need for any changes to the back-end server.

In an illustrative embodiment described herein, the following four types of QoS service classes are provided.

(1) Type 1—Simple priorities: Each class is assigned a priority. The scheduler gives preference to higher priority requests, without consideration of the performance of lower priority requests.

(2) Type 2—Response time targets: Each class has a "response time target" associated therewith. The scheduler ensures that the mean response time of the requests in a class does not exceed the response time target of the class.

(3) Type 3—Best effort: Each class has either a response time target associated therewith or is marked "best effort." The scheduler ensures that the mean response time of the requests in a class does not exceed the response time target of the class. The performance of the best effort classes is optimized within this constraint.

(4) Type 4—xth percentile target: Each class has an "xth percentile target" associated therewith. The scheduler ensures that the xth percentile of response times of the requests in a class do not exceed this target.

Other types of classes are also possible within the spirit and scope of the invention.

Ensuring the QoS targets described above in a scheduler external (such as a front-end scheduler) to the back end server(s) poses the following challenges that the present invention addresses. First, scheduling requests outside the back-end server involves holding back requests outside the server. It is typically critical to ensure that the resulting reduction in the degree of concurrency at the back-end server(s) does not result in a loss of system throughput. Second, providing mean response time targets typically requires predictable mean response times at the back-end server. Third, the scheduler typically needs to decide for each incoming request whether to admit the request immediately or to hold it back (withhold request). Moreover, the scheduler typically has to decide for requests that are held back when and in which order to admit them to the back-end server. Thus, the scheduler may control (e.g., varies by increasing or decreasing) a request withhold rate (e.g., a rate of requests withheld from submission to a server) and thus the number of requests sent to a server so as to, for example, balance server throughput and request response times. It is also to be appreciated that a back-end server may run one or more applications to which requests are being routed. Further, each application may run on a different server.

Referring initially to FIG. 1, a block diagram illustrates a request scheduling system in accordance with an embodiment of the present invention. More particularly, request scheduling system 100 comprises a request characteristics estimator 110, a request classifier 120, a QoS target assignment module 130, a scheduler 140, a multi-programming level (MPL) adaptor 150, and a database (DB) monitor 160. The request scheduling system 100 is accessible by an administrator 170, who may establish request service rules and set QoS targets. Further, as shown in FIG. 1, the request scheduling system 100 is positioned external to and in front of back-end servers 180-1 through 180-n.

The following description will generally explain the functions of each of the above-mentioned system components, followed by a further description of the two core components of the request scheduling system, namely, the scheduler and the MPL adaptor.

The request characteristics estimator 110 estimates request (e.g., query) statistics that are used by the scheduler 140. Examples of such statistics may include expected service time of request and resource usage. The request characteristics estimator 110 uses data (e.g., history data) from the DB monitor 160 as input.

The request classifier 120 assigns the request to a QoS class, e.g., this can be done based on one or more criteria including but not limited to the following: user ID (administrator assigned identifiers to classes), based on shopping history of client (money spent), and type of query: e.g., "browse," "order," etc.

The QoS target assignment module 130 keeps track of the different QoS classes, i.e., the types of each class (one of types 1 to 4 listed above) and the corresponding parameters for the class (e.g., the target response time for a type 2 class).

The scheduler 140 maintains one or more queues. For a given new request, the scheduler either assigns the request to one of the queues, admits the request immediately to one of the servers 180-1 through 180-n, or drops the request. The scheduler makes this decision based on information from the other components of the request scheduling system 100. Upon completion of a request, the scheduler decides whether to admit one or several requests waiting in one of the queues. Again, this decision is based on information from the other components of the request scheduling system 100. The scheduler 140 will be described in further detail below.

The MPL adaptor 150 adapts the target value for the MPL to be maintained by the scheduler 140 to ensure that QoS targets are achievable and that loss of throughput is kept at a minimum. The MPL adaptor 150 uses data from the DB monitor 160 and the QoS target assignment module 130, and provides data to the scheduler 140. The MPL adaptor will be described in further detail below.

The DB monitor 160 keeps track of system statistics needed by the other components, e.g., observed execution times (based on query types), throughput, current MPL, completion rate, and utilization of core resources, e.g. central processing unit (CPU) at the server.

Thus, in this illustrative embodiment, the DB monitor 160 collects the statistics that the request characteristics estimator 110 uses. This could, for example, be the value of the items purchased by a customer within the last month. A difference between the data provided by the DB monitor 160 to the request characteristics estimator 110 and the data provided by the DB monitor 160 to scheduler 140 is that the estimator 110 may typically use semantic data regarding transactions (e.g., customer information based on database data), while the scheduler 140 may typically use data regarding the execution characteristics (e.g., runtime) of a request.

Also, it is to be appreciated that the DB monitor 160 receives input from the servers 180-1 through 180-n. This allows the scheduler 140 to also be aware of responses (to requests) going out from the servers.

As mentioned above, the core components of the request scheduling system 100 are the scheduler 140 and the MPL adaptor 150. A main function of the scheduler is to make decisions on when to admit requests such that the QoS targets of requests are satisfied. Note that the response time of a request is made up of two components: (i) its time spent waiting until the scheduler admits it to the server, i.e., "Twait;" and (ii) the actual time at the server, i.e., "Tserver."

Hence, in order to provide QoS service classes of type 2 and type 4 (i.e., mean response time targets and xth percentile targets), the scheduler preferably should have: (i) an estimate for Tserver for each request, i.e., "E[Tserver],"; and (ii) a guarantee that E[Tserver] is smaller than the QoS target associated with the request. It is to be appreciated that condition (ii) is preferred since once a request is submitted to the server the scheduler may no longer have control over the request, therefore, E[Tserver] is a lower bound on the expected response time of a request.

Conditions (i) and (ii) above are ensured by the MPL adaptor as will be described in detail below, followed by a description of how the scheduler dispatches requests to the server in order to meet QoS goals.

A main function of the MPL adaptor 150 is to maintain an estimate of the maximum number of requests allowed at the server at any time, such that QoS targets can be met by the scheduler 140. This estimate is then given as a recommendation to the scheduler. We refer to the current estimate of the recommended maximum number of requests in the following description as the target multi-programming level (target MPL) of the server.

The MPL adaptor 150 maintains the target MPL by periodically monitoring the mean execution times of requests on a per QoS class basis and adapting the current MPL target if necessary. More particularly, the current MPL target is reduced if, for a given monitoring interval, there is a QoS class such that E[Tserver] for requests in this class exceeds the QoS target of the class. If the deviation of E[Tserver] from the QoS target is small (e.g., less than 10%), the current target MPL is simply reduced by a small constant (e.g., between two and four). If the deviation is more significant, the MPL adaptor 150 may apply a method based on Little's Law (see J. Little, "A Proof of the Theorem," Operations Research, 9:383-387, 1961, the disclosure of which is incorporated by reference herein) to update the MPL target. According to Little's Law, in any system, the response time of a job is (linearly) inversely related to the average number of jobs in the system. Hence, given the observed mean response time and the observed number of requests at the server, one can determine the target MPL necessary to achieve the target response time. By way of example, if the observed Tserver is two times the target value for Tserver, the MPL is reduced by a factor of two.

While the above discussion focused only on the QoS goal of type 2, mean response time targets, the same way of adapting the MPL can also be used for type 4 QoS goals, xth percentile targets. Although Little's Law does not necessarily apply to response time percentiles, it may be used as a good rule of thumb for systems whose internal scheduling policy is close to generalized processor sharing (which is the case for many system resources in today's computer systems, e.g., the CPU).

In addition to the observed mean response times, a second equally important consideration in adjusting the MPL is the system throughput. Setting the MPL to too small values might reduce the utilization of system resources at the server to a degree that results in loss of system throughput. Thus, the MPL adaptor 150 monitors, in addition to response times, the system throughput based on the request arrival rate in the monitoring interval. If after reducing the MPL target, the system throughput drops, even though the arrival rate stayed the same or increased compared to previous monitoring intervals, the MPL adaptor 150 increases the current MPL target again.

Figure 2:
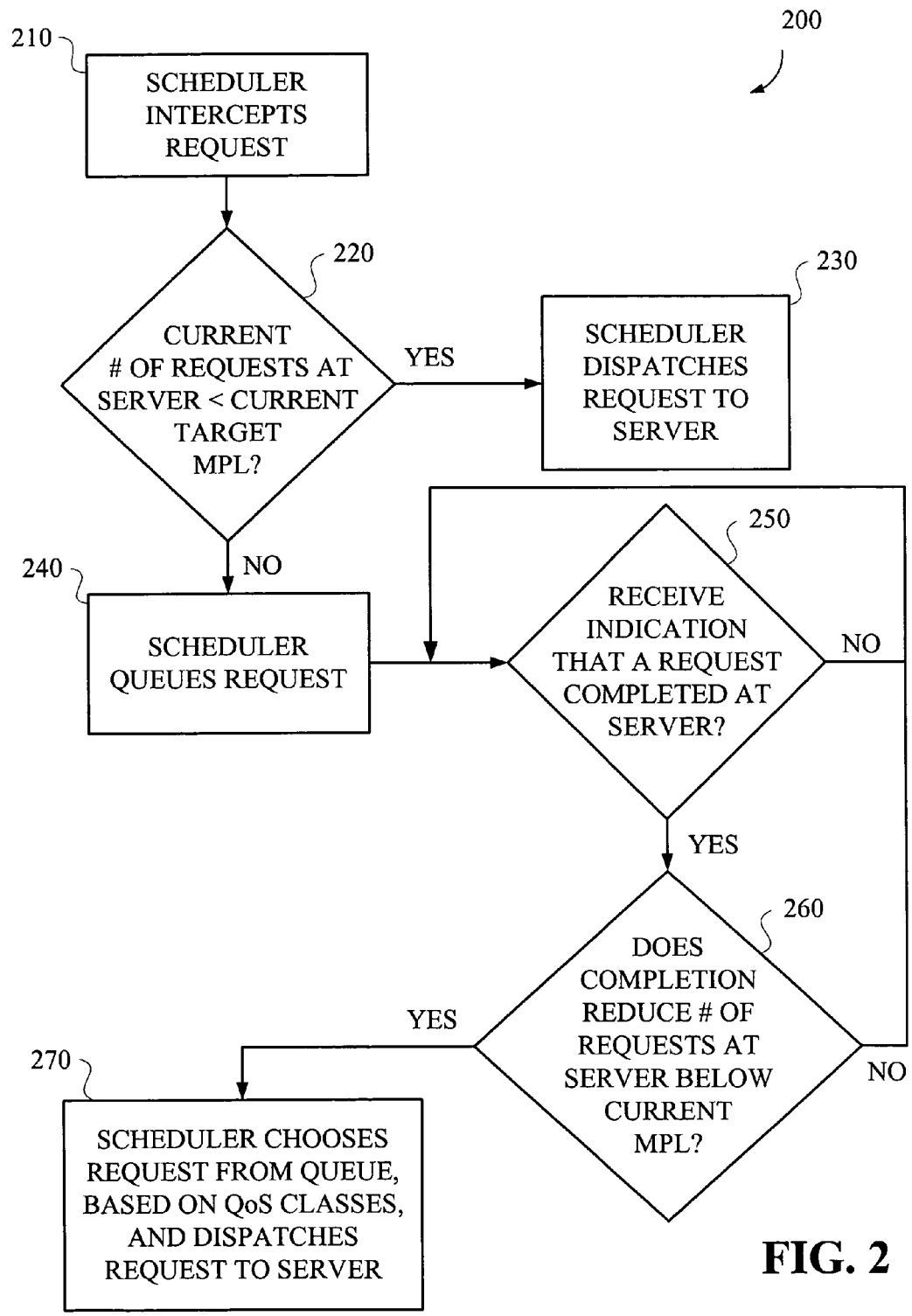
FIG. 2 is a flow diagram illustrating a methodology for dynamically scheduling requests in accordance with an embodiment of the present invention.

Referring now to FIG. 2, a flow diagram illustrates a methodology for dynamically scheduling requests in accordance with an embodiment of the present invention. It is to be appreciated that, as illustratively shown, the scheduling methodology 200 implemented by the scheduler 140 is the same, independent of the QoS type.

As shown, the scheduler intercepts requests submitted to the back-end server (step 210). If the current number of requests at the server is smaller than the current target MPL (step 220), the request is immediately dispatched to the server (step 230). If the current number of requests at the server is equal to or greater than the current MPL target, the request is queued in one of potentially many queues maintained by the scheduler (step 240). Whenever a request completes at the server (step 250), the scheduler checks whether this completion reduces the number of requests at the server below the current MPL target (step 260). If so, a request is chosen from a queue, based on the QoS classes of the requests in the queue(s), and dispatched to the server (step 270). If no indication of request completion is received by the scheduler (step 250) or the request completion does not reduce the number of requests at the server below the current MPL target (step 260), then the method iterates.

Below we describe in detail in which order requests are dispatched from the queue(s) to the server based on the QoS classes of the requests (step 270).

In the case of type 1 targets (simple priorities), the scheduler 140 simply keeps requests sorted by their priorities and dispatches the first request in the queue. Since there are no target response times or percentiles to take into account for the MPL adaptor 150, the MPL target will converge to a low value that still yields an acceptable system throughput. That is, the performance of high priority requests will be optimized within the restriction of not hurting system throughput.

In the case of type 2 targets (response time targets), upon its arrival, each request is assigned a "dispatch deadline" which is a time (preferably the latest time) by which the request should be dispatched to the system in order to meet its response time goal. The dispatch deadline may be computed by a variety of metrics, an exemplary one being (arrival time)+(target response time)−(expected time at server). The scheduler 140 keeps requests sorted by their dispatch deadlines. The scheduler will typically dispatch the request with the lowest dispatch deadline first.

Next we consider a workload including not only type 2 requests, but also type 3 requests (best effort). Recall that in this case, the goal is to achieve good performance for the type 3 requests without violating the response time targets of the type 2 requests. The scheduler 140 does so by maintaining two queues. One that keeps type 2 requests sorted by their dispatch deadlines and one that keeps the type 3 requests sorted in First-Come-First-Serve (FCFS) order. When choosing a request for dispatching, the scheduler first compares the current time to the dispatch deadline of the first request in the type 2 queue. If the dispatch deadline is met or already exceeded, the first request in the type 2 queue is dispatched. Otherwise, the first request from the type 3 queue is dispatched.

In the case of type 4 targets (xth percentile targets), percentile targets can be achieved in a similar manner as the above-mentioned response time targets. One difference is that instead of a formula such as (arrival time)+(target response time)−(expected time at server), for type 4 requests a formula such as (arrival time)+(target for xth percentile)−(expected time at server for xth percentile) may be used.

It is to be appreciated that, in addition to the above-mentioned core scheduling rules, one or more of other rules may be included to improve throughput and system performance. By way of example only, one or more of the following rules may also be employed.

(1) Resource based admission. The resource usage (in terms of CPU cycles, I/O time, and lock wait time) of an incoming request is estimated. The request is admitted directly if either: (a) the request does not increase the MPL beyond the current MPL limit; or (b) the request uses mostly resources that have low utilization levels.

(2) Feasibility of response time targets. At times it might not be feasible to meet all response time targets due to unusually high system load. In this case, there are at least two choices: (i) make all requests with response time targets suffer equally; or (ii) try to stick to the most stringent response time targets as long as possible and let the other requests suffer (the argument behind the second choice being that the requests with more stringent response time targets have been assigned this stringent target since they are more critical or important to the system). The first choice is simply achieved by continuing to serve requests from the queue by the order of their dispatch deadlines. To achieve the second choice when picking a request for dispatching, the scheduler first identifies all requests whose dispatch deadlines are already reached or passed. If the scheduler finds any such requests, the scheduler picks the one with the lowest response time target (which is not necessarily the one with the smallest dispatch deadline). If there are no such requests, the scheduler picks the request with the shortest dispatch deadline.

(3) Runtime based admission. The runtime of an incoming priority request is estimated (e.g., by using data available from the database through a query optimizer). Then, this estimate is used to admit requests in the admission queue in SJF (Shortest-Job-First) order instead of FCFS (First-Come-First-Serve) order.

(4) Starvation Prevention. To prevent best effort requests from waiting forever in the admission queue, one can set a limit for the maximum tolerable wait time. Once a best-effort request has been in the admission queue for the maximum wait time, the request is admitted, even if this could jeopardize the target response times for high priority requests.

(5) Avoiding overload. The MPL adaptor can detect, in addition to loss in throughput due to under-utilization of resources, a loss in throughput due to over-utilization or overload of resources. In this case, the MPL adaptor will reduce the MPL.

A variation within the spirit and scope of the invention is to have different applications running on the system which are invoked to satisfy requests. These different applications may be, but are not necessarily, different invocations of the same program. The idea is that a request can be satisfied by more than one application. The system picks an appropriate application to satisfy a request based on the QoS requirements.

Different applications may have different expected response times. The expected response times for different applications can be controlled by a number of factors, including but not limited to the following:

1. The number of requests per unit time the scheduler sends to an application.
2. Applications can run on different servers. Some applications may run on slower servers than others.
3. The system may include a plurality of servers in which different numbers of applications run on different servers. A server with a large number of applications would typically have slower response times than one running a small number of applications.

The system monitors response times of different applications and satisfies QoS requirements based on the expected response times of applications. Similar techniques to those described earlier are used for scheduling requests. A difference is that instead of basing decisions on predicted server response times, decisions are based on predicted application response times.

It is to be further appreciated that a service provider could provide aspects of the present invention in the following illustrative way. Clients could be assigned to different QoS classes, for example, as mentioned above, wherein one or more target request response times would be assigned to each class. The service provider could provide different options for grouping clients into different QoS classes. One such method would be for levels of service to be specified via service level agreements (i.e., formal or informal). The requests could then be serviced in accordance with such characteristics as estimated server response time and in accordance with request withholding rules (e.g., queuing rules), as specified above.

Figure 3:
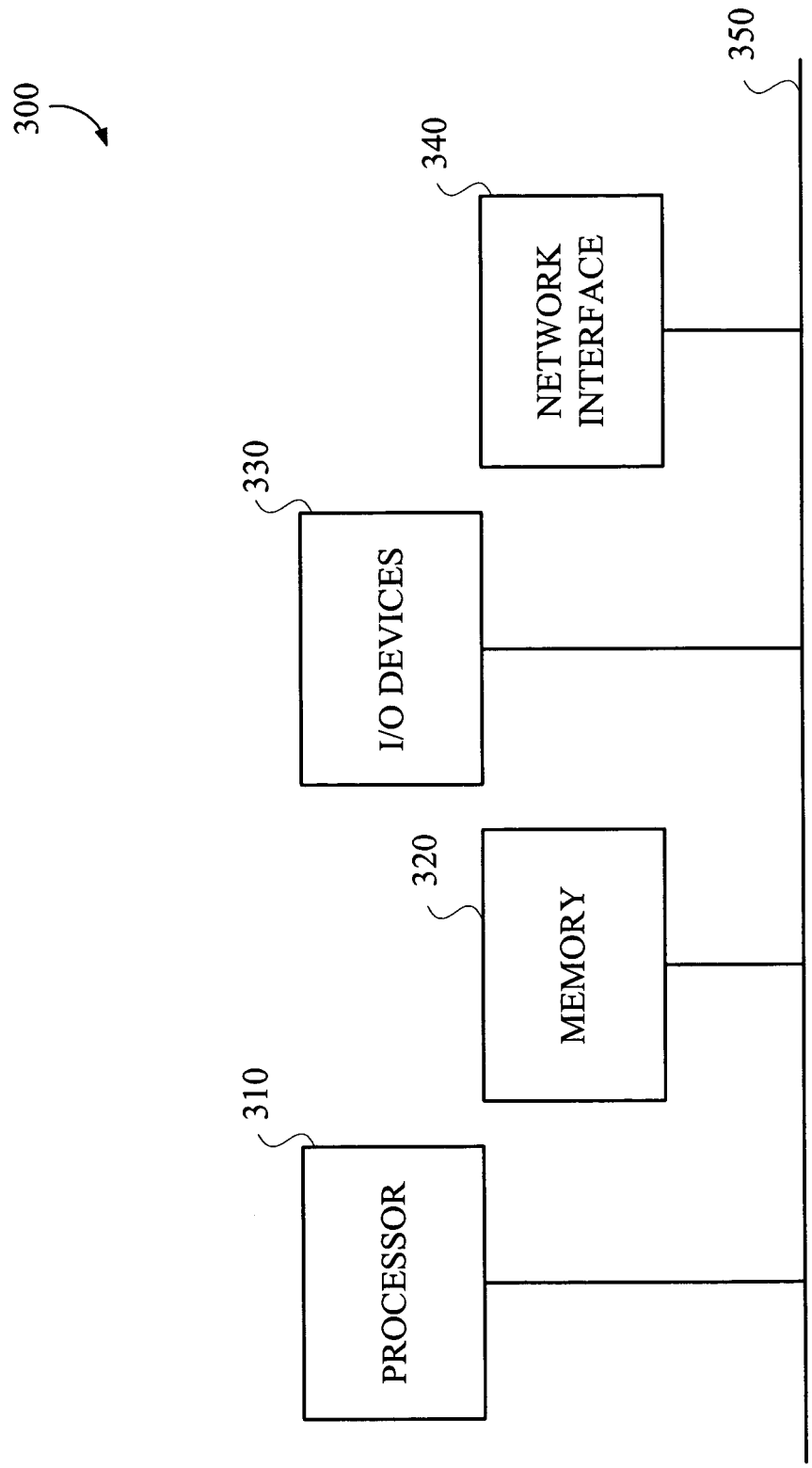
FIG. 3 is a block diagram illustrating a computing system with which embodiments of the present invention may be implemented.

Referring lastly to FIG. 3, a block diagram illustrates a computing system with which embodiments of the present invention may be implemented. More particularly, FIG. 3 illustrates an illustrative hardware implementation of a computing system in accordance with which one or more components/steps of a request scheduling system (e.g., components/steps described in the context of FIGS. 1 and 2) may be implemented, according to an embodiment of the present invention. For example, an illustrative computing system architecture such as that shown in FIG. 3 may be used in implementing any and all client devices, servers, and components of the scheduling system, etc., as mentioned above.

Further, it is to be understood that the individual components/steps may be implemented on one such computer system, or more preferably, on more than one such computer system. In the case of an implementation on a distributed computing system, the individual computer systems and/or devices may be connected via a suitable network, e.g., the Internet or World Wide Web. However, the system may be realized via private or local networks. The invention is not limited to any particular network.

As shown, the computer system 300 may be implemented in accordance with a processor 310, a memory 320, I/O devices 330, and a network interface 340, coupled via a computer bus 350 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit. For example, administrator 170 (FIG. 1) may interface with the request scheduling system via block 330.

Still further, the phrase "network interface" as used herein is intended to include, for example, one or more transceivers to permit the computer system to communicate with another computer system (e.g., client devices, application servers, back-end servers, etc.) via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of processing a request to at least one server, comprising the steps of:
    a processor receiving the request; and
    the processor determining when to submit the request to the at least one server based on: (i) a quality-of-service (QoS) class assigned to a client from which the request originated; (ii) a response target associated with the QoS class; and (iii) an estimated response time associated with the at least one server.

2. The method of claim 1, further comprising the step of withholding the request from submission to the at least one server when the request originated from a client assigned to a first QoS class to allow a request that originated from a client assigned to a second QoS class to meet a response target associated therewith.

3. The method of claim 2, further comprising the steps of:
    determining a throughput of the at least one server; and
    reducing a request withhold rate to increase throughput of the at least one server.

4. The method of claim 2, further comprising the steps of:
    monitoring a throughput of the at least one server; and
    varying a request withhold rate to balance the throughput and request response times.

5. The method of claim 1, further comprising the step of assigning the response target to the QoS class.

6. The method of claim 5, wherein the step of assigning the response target to the QoS class further comprises the step of assigning a response time target to the QoS class.

7. The method of claim 5, wherein the step of assigning the response target to the QoS class further comprises the step of assigning a response percentile target to the QoS class.

8. The method of claim 1, further comprising the step of estimating the response time associated with the at least one server based on one or more requests sent to the at least one server within a given time period.

9. The method of claim 1, further comprising the step of assigning a target response time to a plurality of QoS classes in which lower quality classes are assigned larger response times than higher quality classes.

10. The method of claim 1, further comprising the steps of:
determining dispatch times for requests from a difference between at least one predicted response time of the at least one server and the target response time corresponding to the QoS class of the request; and
sending requests to the at least one server based on dispatch times.

11. The method of claim 1, wherein a plurality of applications are running on the at least one server and requests are routed to applications, further comprising the steps of:
estimating response times of applications based on one or more requests sent to the applications within a time period; and
sending a request to an application whose estimated response time is not greater than a target response time corresponding to the QoS class of the request.

12. The method of claim 11, further comprising the step of varying a number of requests sent to applications so that estimated response times of applications are not greater than target response times of QoS classes corresponding to requests sent to the applications.

13. The method of claim 11, wherein the at least one server comprises a plurality of servers and each application runs on a different one of the plurality of servers.

14. Apparatus for processing a request to at least one server, comprising:
a memory; and
at least one processor coupled to the memory and operative to receive a request, and determine when to submit the request to the at least one server based on: (i) a quality-of-service (QoS) class assigned to a client from which the request originated; (ii) a response target associated with the QoS class; and (iii) an estimated response time associated with the at least one server;
wherein scheduling submission of the request to the at least one server comprises determining when to submit the request to the at least one server.

15. The apparatus of claim 14, wherein the memory and the at least one processor form a scheduler that is external to the at least one server.

16. The apparatus of claim 15, wherein the scheduler is a front-end scheduler and the at least one server is a back-end server.

17. An article of manufacture for processing a request to at least one server, comprising a computer readable medium containing one or more programs which when executed implement the steps of:
receiving the request; and
determining when to submit the request to the at least one server based on: (i) a quality-of service (QoS) class assigned to a client from which the request originated; (ii) a response target associated with the QoS class; and (iii) an estimated response time associated with the at least one server.

18. A method of processing requests to at least one server, comprising the steps of:
assigning at least one client to a quality-of-service (QoS) class from among at least two QoS classes;
assigning a response target to at least one QoS class;
estimating at least one response time of the at least one server based on one or more requests sent to the server within a given time period; and
a processor withholding submission of requests associated with a first one of the at least two QoS classes to allow requests associated with a second one of the at least two QoS classes to meet its response target based on the at least one estimated response time.

19. The method of claim 18, further comprising the steps of:
determining a throughput of the at least one server; and
reducing a request withhold rate to increase throughput of the at least one server.

20. The method of claim 18, further comprising the steps of:
monitoring a throughput of the at least one server; and
varying a request withhold rate to balance the throughput and request response times.

21. The method of claim 18, further comprising the steps of:
determining dispatch times for requests from a difference between at least one predicted response time of the at least one server and the target response time corresponding to the QoS class of the request; and
sending requests to the at least one server based on dispatch times.

22. The method of claim 18, wherein a plurality of applications are running on the at least one server and requests are routed to applications, further comprising the steps of:
estimating response times of applications based on one or more requests sent to the applications within a time period; and
sending a request to an application whose estimated response time is not greater than a target response time corresponding to the QoS class of the request.

23. The method of claim 22, further comprising the step of varying a number of requests sent to applications so that estimated response times of applications are not greater than target response times of QoS classes corresponding to requests sent to the applications.

24. The method of claim 22, wherein the at least one server comprises a plurality of servers and each application runs on a different one of the plurality of servers.

25. A method of providing a scheduling service for requests to at least one server, comprising the step of:
a service provider providing a scheduler comprising a processor operative to: (i) assign at least one client to a quality-of-service (QoS) class from among at least two QoS classes; (ii) assign a response target to at least one QoS class; (iii) estimate at least one response time of the at least one server based on one or more requests sent to the server within a given time period; and (iv) withhold submission of requests associated with a first one of the at least two QoS classes to allow requests associated with a second one of the at least two QoS classes to meet its response target based on the at least one estimated response time.

* * * * *